June 20, 1950  C. F. TELFOR ET AL  2,511,954
BEVEL GEAR HOLDER
Filed March 3, 1947  2 Sheets-Sheet 1
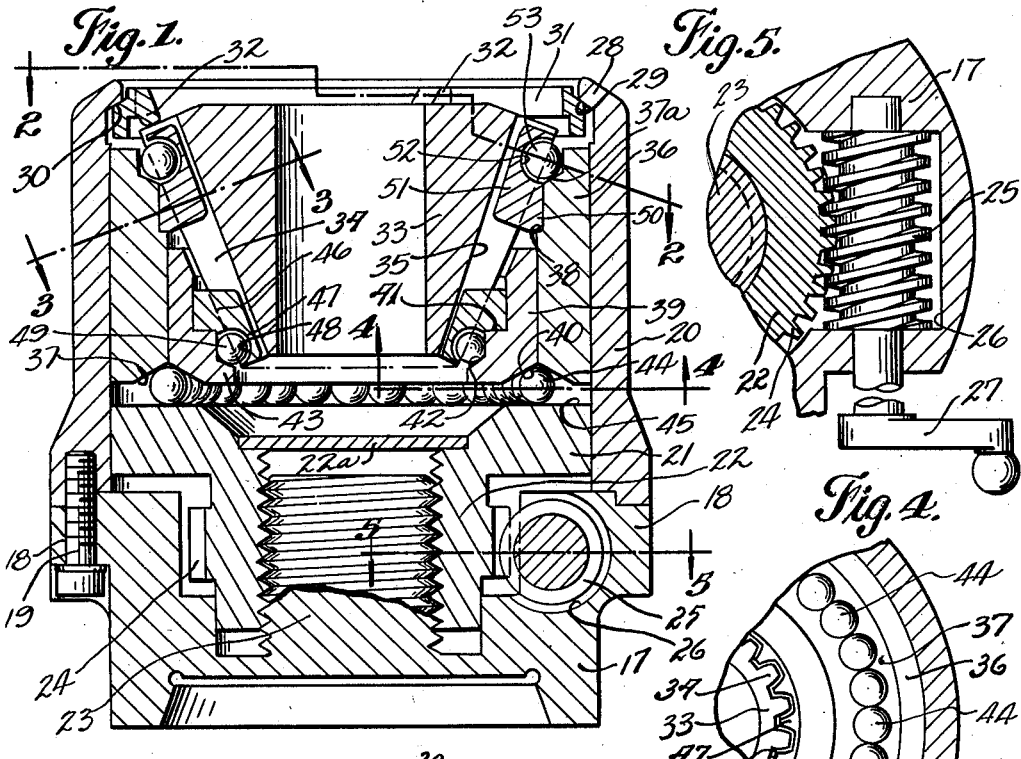
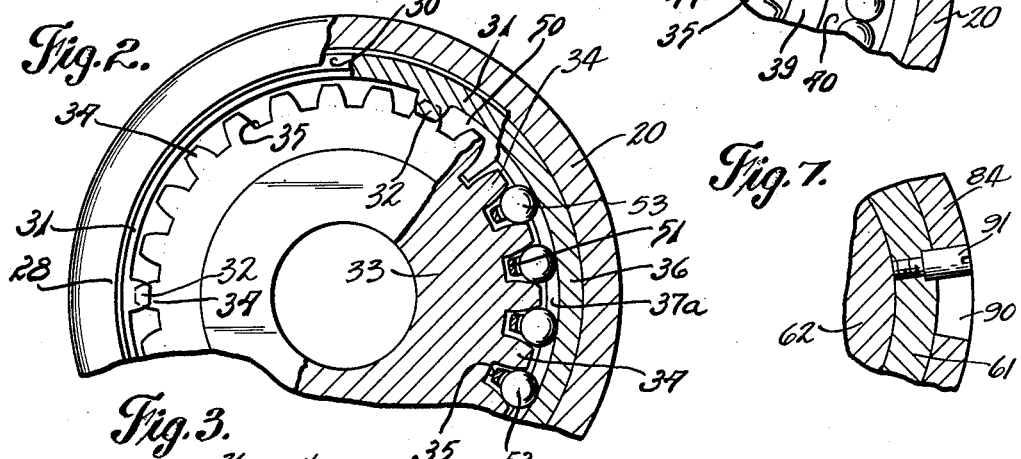
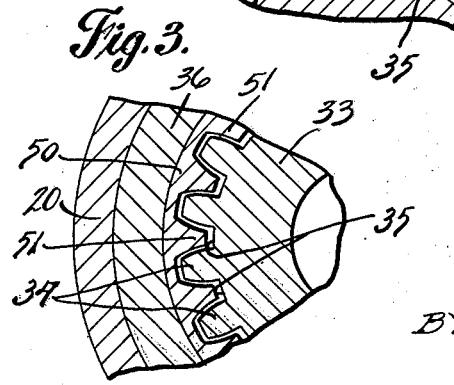
INVENTORS.
CLARENCE F. TELFOR AND
CHRISTIAN PALLENBERG.
BY Thos. J. Donnelly
ATTORNEY.

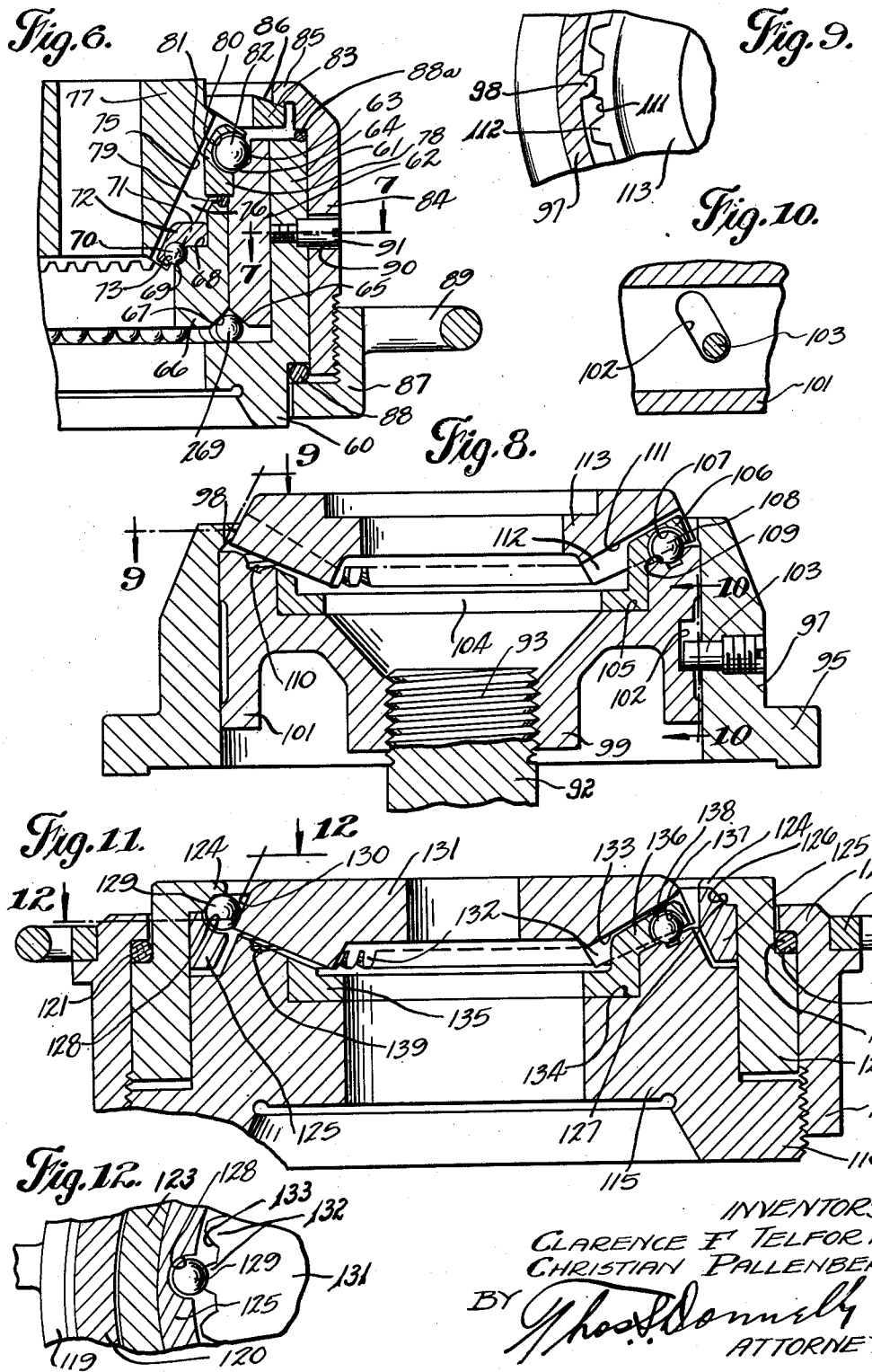

Patented June 20, 1950

2,511,954

UNITED STATES PATENT OFFICE 2,511,954

BEVEL GEAR HOLDER

Clarence F. Telfor, St. Clair Shores, and Christian Pallenberg, Detroit, Mich.

Application March 3, 1947, Serial No. 732,084

2 Claims. (Cl. 279—1)

Our invention relates to a new and useful improvement in a gear holding device adapted for holding a gear properly centered while the bore thereof is being bored or being finished.

It is an object of the present invention to provide a device of this class which will be simple in structure, economical to manufacture, durable, compact, easily and quickly operated and highly efficient in use.

Another object of the invention is the provision of a device of this class so constructed and arranged that it may be adjusted to gears of various sizes and that when it is adjusted to a particular size a gear may be easily and quickly released for replacement with another and the other quickly fastened in position.

Another object of the invention is the provision in a device of this class of a plurality of balls adapted for engaging between the teeth of the gear and provided with mechanism for forcing the balls to engage the opposed faces of adjacent teeth to properly center the gear.

Another object of the invention is the provision of a device of this class particularly adapted for centering bevel gears and so arranged and constructed that the teeth of the bevel gear may be engaged at spaced apart points by centering means and the centering means cooperatively move into position for centering the gear.

Another object of the invention is the provision of a simple and easily operated mechanism for pressing the teeth engaging members into engaging position for quickly centering the gear.

Other objects will appear hereinafter.

It is recognized that various modifications and changes may be made in the detail of structure illustrated without departing from the invention itself and it is intended that such variations shall be embraced within the scope of the claims which form a part hereof.

Forming a part of this specification are drawings in which,

Fig. 1, is a longitudinal central sectional view of one form of the invention,

Fig. 2, is a fragmentary sectional view taken on line 2—2 of Fig. 1,

Fig. 3, is a fragmentary sectional view taken on line 3—3 of Fig. 1,

Fig. 4, is a fragmentary sectional view taken on line 4—4 of Fig. 1,

Fig. 5, is a fragmentary sectional view taken on line 5—5 of Fig. 1,

Fig. 6, is a fragmentary central vertical sectional view showing a modification of the invention, Fig. 7, is a fragmentary sectional view taken on line 7—7 of Fig. 6, Fig. 8, is a vertical central sectional view showing a further modification of the invention, Fig. 9, is a fragmentary view taken on line 9—9 of Fig. 8, Fig. 10, is a fragmentary view taken on line 10—10 of Fig. 8, Fig. 11, is a central sectional view showing a further modification of the invention, Fig. 12, is a fragmentary view taken on line 12—12 of Fig. 11.

In the form shown in Fig. 1, we have shown a supporting member 17 which may be mounted in the chuck of a lathe or other similar tool which is intended to perform the operation on the gear. The supporting member 17 is provided with a peripheral flange 18 through which are projected screws 19 for securing the tubular sleeve 20 in fixed relation thereto. Positioned within this sleeve 20 is an annular flange 21 projecting outwardly from one end of the internally threaded hub 22 which is threaded on the externally threaded stud 23 projecting upwardly from the supporting member 17. This hub 22 is provided on its periphery with the worm teeth 24 meshing with the worm 25 which is positioned in the recess 26 formed in the supporting member 17 and which may be rotated by means of the crank 27. When the worm 25 is rotated the hub 22 will rotate and thus thread onto the stud 23 or off of it so that the flange portion 21 will move axially of the sleeve 20 and serve as a thrust member. A sealing plate 22a is mounted on the member 21 so as to prevent entry of dust or other foreign material into the bore of the hub 22.

At the upper end of the sleeve 20 there is an inwardly projecting overhanging lip 28 having, on its under surface, the beveled face 29 adapted to bear against the bevel face 30 formed on the presser ring 31 which is provided at spaced apart points with the inwardly projecting tooth 32 which is adapted to engage the end face of the bevel gear 33 having the teeth 34 between each of which is a space 35.

Positioned within the sleeve 20 is a presser sleeve 36 having a beveled face 37 at one end and a beveled face 37a at its opposite end and cut away to provide a shoulder 38. Positioned within this presser sleeve 36 is a ring 39 having on its lower face the beveled surface 40 and provided with a shoulder 41 and a beveled surface 42 which forms the upper face of the inwardly projecting tongue 43 at the lower end of the member 39. The surfaces 37 and 40, as clearly shown in Fig. 1, form a race-way for the balls 44 which bear on the upper face 45 of the flange 21.

Resting on the shoulder 41 is a ring 46 having the circumferentially spaced apart tongues 47 in each of which is formed a cavity 48 in which engages a ball 49 which is adapted to bear against the beveled face 42. These tongues 47 are of less width than the space 35 between adjacent teeth 34 and, as clearly shown in Fig. 2, do not offer resistance to radial movement inwardly between the teeth 34.

Resting upon the shoulder 38 is a ring 50 having the inwardly projecting circumferentially spaced apart tongues 51 which are adapted to engage in the spaces 35 between the teeth and in each of which is formed a cavity or recess 52 in which is positioned a ball 53 resting upon the beveled face 37a.

The construction is such that when the parts are in the assembled position shown in Fig. 1, a rotation of the hub 22 to unthread it from the stud 23 will cause the flange 21 to move upwardly and thus serve as a thrusting member for thrusting against the balls 44. As this thrust is delivered the presser sleeve 36 would move upwardly as would likewise the ring 39 and the ring 50 thus forcing the gear 33 into contact with the tongues or members 32. As this pressure continues, the balls would be forced, on account of their contact with the beveled faces, to move radially inwardly between adjacent teeth so as to engage the opposed faces of adjacent teeth. The engagement of the balls 49 and the balls 53 would, of course, be simultaneous so that there would thus be effected a centering of the gear relative to the supporting member 17. The use of the balls and the various parts assembled as indicated affords a structure which may be easily and quickly operated and which will not bind in operation. It also affords a means for centering a bevel gear by engaging the teeth which are inclined to the axis of the gear at spaced apart points.

In Fig. 6, we have shown a slight modification in which the supporting member comprises a ring 60 having a sleeve 61 formed integral therewith in which is positioned a presser sleeve 62 having the recess 63 and provided with the bevel face 64 on one end and a beveled face 65 on the opposite end. Positioned within the ring 62 is a ring 66 having a beveled face 67, these beveled faces 65 and 67 forming a race-way for the balls 269 which bear against the upper face of the ring 60. A ring 66 is cut away as at 68 and provided with a beveled face 69 against which bears a ball 70 positioned in the cavity 73 formed in the tongue 72 which projects from the ring 71 and which is adapted to engage in the space 75 between the teeth 76 of the gear 77. A ring 78 is positioned within the sleeve 62 and bears upon the sealing ring 79 which engages the upper face of the ring 66. This ring 78 is provided with the circumferentially spaced tongues 81 in each of which is formed a cavity 80 in which is positioned a ball 82 bearing upon the beveled face 64. A gear engaging ring 83 is positioned within the sleeve 84 and engaged by the over-hanging lip 85 on the sleeve 84 the ring 83 having a beveled face 86 against which the lip 85 bears. This ring 83 is adapted to engage the end faces of the teeth 76 formed on the gear 77.

Threaded on the sleeve 84 is a ring 87 having the gripping portion 89 whereby this ring 87 may be rotated. Sealing strips 88 and 88a are positioned between the sleeves 84, the ring 87, and the sleeve 61. Formed in the sleeve 84 is a spirally directed slot 90 in which engages a stud 91 threaded into the sleeve 61.

The construction is such that when the gear is placed as shown in Fig. 6, the presser ring 83 in position, the ring 87 may be threaded on the ring 84 so as to draw the various parts inwardly and force the balls 74 and 82 inwardly to engage opposed faces of adjacent teeth and center the gear relatively to the member 60. When this position has been reached the stud 91 will be at one end of the slot 90. In order to release the gear it is but necessary to rotate the ring 87 in the opposite direction so that the stud will engage the opposite end of the slot and when in this position the gear may be removed. Consequently, it is a simple and easy operation to remove and replace the gears when the desired size has been obtained through the adjustment effected by the parts as described.

In Fig. 8, we have shown a further modification in which there is a supporting member 97. The upper end of this supporting member 97 is provided with the inwardly projecting circumferentially spaced apart tongues 98 which are adapted to engage the periphery of the bevel gear 113 or the ends of the teeth 112 which are formed on the gear. Projecting centrally of the supporting member 92 is an externally threaded stud 93 which constitutes an end of a hydraulically or pneumatically operated draw bar. Threaded onto the member 93 is a hub 99 which carries the ring 101 in which is formed the groove 102 for reception of the end of the stud 103 which is threaded through the member 97. A ring 104 rests upon the face 105 and this ring 104 is provided with a plurality of circumferentially spaced apart tongues 106 in each of which is formed a cavity 107 for reception of a ball 108, this ball resting upon the beveled face 109 of the member 101 and being adapted to engage in the space 111 between the opposed faces of adjacent teeth 112. The construction is such that when a gear is placed in position, the hub 39 is threaded onto the stud into proper position so that when the parts are moved to the position shown in Fig. 8, the gear will be securely clamped in position. The tongues 98 will contact the gear and the balls 108 will engage in the spaces 111 and bear against the opposed faces of adjacent teeth 112 so as to properly center the gear relatively to the holder 97. When the draw bar 93 is moved downwardly from the position shown in Fig. 8, the hub 99 will rotate slightly because of the action of the stud 103 in the slot 102 and thus the gear will be released from the pressure of the tongues 98. When the draw bar is moved in the opposite direction the gear will be forced into contact against the tongues 98 and the balls 108 will be forced into contact with the opposed faces of the teeth to securely hold the gear in position. Consequently, when the device is adjusted for a definite size gear, the gear may be removed and replaced without disturbing the adjustment of the mechanism and this securing of the gear in position and releasing it is effected through the longitudinal movement of the draw bar of which the stud 93 forms a part.

In Fig. 11, we have shown a further modification in which a supporting member 115 is provided with the peripherally threaded flange 116 on which is threaded the sleeve 117 on which is mounted the ring 119 having the grips 118 formed thereon. An inwardly projecting flange on the sleeve 117 serves to engage a sealing strip 121 resting upon the shoulder 122 formed on the ring 123. This ring 123 is provided at its upper end with the inwardly projecting flange 124 to overlie the ring 125. This flange 124 is provided with the beveled face 126 which engages the beveled face 127 on the ring 125. This ring 125 is provided with the plurality of spaced apart cavities 128 in which engages a ball 129 which is adapted to bear against the end faces 130 of the teeth 132 of the gear 131. Positioned on the shoulder 134, formed on the support 115, is the ring 135 having a plurality of circumferentially spaced apart tongues 136, each of which is adapted to engage in the space 133 between adjacent teeth 132. Each of these tongues 136 is provided with a recess or cavity 137 for reception of a ball 138.

The construction is such that upon a threading of a ring or sleeve 117 onto the flange 116, the member 123 will be drawn axially downwardly to force the balls 129 against the end faces of the teeth 132 and to force the balls 138 to engage the opposed faces of adjacent teeth so that the gear 131 thus becomes centered relatively to the support 116. The balls 138 pressed in the raceway formed by the beveled face 139 on the member 115.

Experience has shown that a holding device of this class is admirably adapted for centering a bevel gear and that the centering may be quickly effected and the gear held rigid so that it cannot become displaced during an operation such as a finishing or boring operation.

What we claim as new is:

1. A gear holding device of the class described, comprising: a supporting member; a tubular sleeve secured to and projecting outwardly from one end of said supporting member, said supporting member having a recess formed therein; a threaded stud projecting upwardly from the base of said recess centrally thereof; a hub threadable onto and off of said stud; a flange on one end of said hub and positioned in said sleeve; a presser sleeve positioned within said first named sleeve and movable axially thereof and having one of its end bases beveled on the inner side and provided intermediate its ends with a shoulder and an inwardly directed beveled face beveled in the direction opposite the direction of the beveled end; a ring positioned within said presser sleeve and movable axially thereof and having a beveled surface on one of its faces co-operating with the end beveled face of said presser sleeve to provide a ball race; balls positioned in said ball race and engaging said beveled surfaces and the face of said flange; a shoulder on said ring projecting inwardly from the inner face thereof; a ring resting on said last named shoulder; a plurality of circumferentially spaced apart tongues on said last named ring adapted for engagement in the spaces between the teeth of a bevel gear to be operated upon, each of said tongues having a cavity formed therein for the reception of a ball; a ball positioned in each of said cavities and adapted upon axial movement of said first named ring for moving into engagement with the faces of teeth of a gear to be operated upon; a ring carried on the shoulder of said presser sleeve; a plurality of circumferentially spaced apart tongues on said last named ring adapted for engaging in the spaces between the teeth of a bevel gear to be operated upon, each of said tongues having a cavity for the reception of a ball; and a ball positioned in each of said last named cavities and adapted for moving into engagement with the faces of the teeth of a bevel gear to be operated upon, upon axial movement of said presser ring; an inwardly directed lip on the end of said first named sleeve; means engageable with said lip and the end of a bevel gear to be operated upon for resisting axial movement of said bevel gear.

2. A gear holding device of the class described, comprising: a supporting member; a tubular sleeve secured to and projecting outwardly from one end of said supporting member, said supporting member having a recess formed therein; a threaded stud projecting upwardly from the base of said recess centrally thereof; a hub threadable onto and off of said stud; a flange on one end of said hub and positioned in said sleeve; a presser sleeve positioned within said first named sleeve and movable axially thereof and having one of its end bases beveled on the inner side and provided intermediate its ends with a shoulder and an inwardly directed beveled face beveled in the direction opposite the direction of the beveled end; a ring positioned within said presser sleeve and movable axially thereof and having a beveled surface on one of its faces co-operating with the end beveled face of said presser sleeve to provide a ball race; balls positioned in said ball race and engaging said beveled surfaces and the face of said flange; a shoulder on said ring projecting inwardly from the inner face thereof; a ring resting on said last named shoulder; a plurality of circumferentially spaced apart tongues on said last named ring adapted for engagement in the spaces between the teeth of a bevel gear to be operated upon, each of said tongues having a cavity formed therein for the reception of a ball; a ball positioned in each of said cavities and adapted upon axial movement of said first named ring for moving into engagement with the faces of teeth of a gear to be operated upon; a ring carried on the shoulder of said presser sleeve; a plurality of circumferentially spaced apart tongues on said last named ring adapted for engaging in the spaces between the teeth of a bevel gear to be operated upon, each of said tongues having a cavity for the reception of a ball; and a ball positioned in each of said last named cavities and adapted for moving into engagement with the faces of the teeth of a bevel gear to be operated upon, upon axial movement of said presser ring; an inwardly directed lip on the end of said first named sleeve; means engageable with said lip and the end of a bevel gear to be operated upon for resisting axial movement of said bevel gear; and means accessible exteriorly of said supporting member for rotating said hub on said stud for delivering a thrust to said first named balls for moving said rings axially of said first named sleeve for forcing the balls thereof into engagement with the side faces of the teeth of a beveled gear positioned therein.

CLARENCE F. TELFOR.
CHRISTIAN PALLENBERG.

REFERENCES CITED

The following references are of record in the file of this patent:

UNITED STATES PATENTS

| Number | Name | Date |
|---|---|---|
| 1,056,954 | Sponable | Mar. 25, 1913 |
| 1,370,598 | Lapointe | Mar. 8, 1921 |
| 1,664,085 | Naylon | Mar. 27, 1928 |
| 1,850,614 | Aisenstein | Mar. 22, 1932 |